(12) United States Patent
Mortazavi

(10) Patent No.: US 9,378,058 B2
(45) Date of Patent: Jun. 28, 2016

(54) METHOD AND SYSTEM FOR DYNAMIC CONTROL OF A MULTI-TIER PROCESSING SYSTEM

(71) Applicant: Masood Mortazavi, San Jose, CA (US)

(72) Inventor: Masood Mortazavi, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 150 days.

(21) Appl. No.: 13/775,678

(22) Filed: Feb. 25, 2013

(65) Prior Publication Data

US 2014/0244980 A1   Aug. 28, 2014

(51) Int. Cl.
G06F 9/46 (2006.01)
G06F 9/50 (2006.01)
G06F 11/30 (2006.01)

(52) U.S. Cl.
CPC .... *G06F 9/50* (2013.01); *G06F 11/30* (2013.01); *G06F 2209/501* (2013.01)

(58) Field of Classification Search
None
See application file for complete search history.

(56) References Cited

U.S. PATENT DOCUMENTS

| 2002/0174214 A1* | 11/2002 | Carl et al. ............... 709/224 |
| 2003/0023505 A1* | 1/2003 | Eglen et al. ............. 705/26 |
| 2003/0120795 A1* | 6/2003 | Reinshmidt ............... 709/232 |
| 2003/0229623 A1* | 12/2003 | Chang et al. .............. 707/3 |
| 2004/0030739 A1* | 2/2004 | Yousefi'zadeh ........... 709/201 |
| 2005/0273643 A1* | 12/2005 | Carroll et al. ............ 714/1 |
| 2006/0015512 A1* | 1/2006 | Alon et al. ............... 707/100 |
| 2006/0064481 A1* | 3/2006 | Baron et al. .............. 709/224 |
| 2006/0136574 A1* | 6/2006 | Anand .................. 709/219 |
| 2007/0013948 A1* | 1/2007 | Bevan .................. 358/1.15 |
| 2007/0081516 A1* | 4/2007 | Arimilli et al. ........... 370/351 |
| 2008/0005317 A1* | 1/2008 | Diao et al. .............. 709/224 |
| 2008/0097961 A1* | 4/2008 | Dias et al. .............. 707/2 |
| 2010/0066546 A1* | 3/2010 | Aaron .................. 340/601 |
| 2010/0220742 A1* | 9/2010 | Brewer et al. ............ 370/412 |
| 2011/0040876 A1* | 2/2011 | Zhang et al. ............. 709/226 |
| 2011/0055001 A1* | 3/2011 | Mattern et al. .......... 705/14.43 |
| 2012/0028664 A1* | 2/2012 | Zhang et al. ............. 455/501 |
| 2012/0084776 A1* | 4/2012 | Pirvu .................. 718/1 |
| 2012/0260258 A1* | 10/2012 | Regini et al. ............. 718/104 |
| 2012/0304172 A1* | 11/2012 | Greifeneder et al. ....... 718/1 |
| 2014/0082310 A1* | 3/2014 | Nakajima ............... 711/162 |
| 2014/0164498 A1* | 6/2014 | Adkins et al. ............ 709/203 |

* cited by examiner

Primary Examiner — Emerson Puente
Assistant Examiner — Mehran Kamran
(74) Attorney, Agent, or Firm — Pillsbury Winthrop Shaw Pittman LLP

(57) ABSTRACT

Method, system, and programs for dynamic control of a processing system having a plurality of tiers. Queue lengths of a plurality of nodes in one of the plurality of tiers are received. A control objective is received from a higher tier. One or more requests from the higher tier are processed by the plurality of nodes in the tier. A control model of the tier is computed based on the received queue lengths. One or more parameters of the control model are adjusted based on the received control objective. At least one control action is determined based on the control model and the control objective.

17 Claims, 12 Drawing Sheets

METHOD AND SYSTEM FOR DYNAMIC CONTROL OF A MULTI-TIER PROCESSING SYSTEM

CROSS-REFERENCE TO RELATED APPLICATION

This application is related to pending U.S. Patent Application having application Ser. No. 13/274,385, filed on Oct. 17, 2011, having inventors Adwait Tumbde et al., entitled "METHOD AND SYSTEM FOR WORK LOAD BALANCING," and pending U.S. Patent Application having application Ser. No. 13/671,046, filed on Nov. 7, 2012, having inventor Masood Mortazavi, entitled "METHOD AND SYSTEM FOR WORK LOAD BALANCING," all of which are incorporated herein by reference in their entireties.

BACKGROUND

1. Technical Field

The present teaching relates to methods, systems, and programming for dynamic control of a multi-tier processing system.

2. Discussion of Technical Background

Networks of Queues are used to model potential contention and queuing when a set of resources is shared. Such a network can be modeled by a set of service centers (tiers). Each tier may contain one or more nodes. After a job (request) is served by a tier, it may reenter the same tier, move to the lower tier, or leave the system. The theory of Networks of Queues is applied today to install and manage massively scalable multi-tier processing applications on distributed systems ("cloud").

However, it is extremely difficult to dynamically scale a multi-tier application on the cloud because scaling of one tier may often lead to bottlenecks in other tiers. In other words, the known multi-tier processing systems lack an effective tool for coordinated scaling and elasticity across multiple tiers. Therefore, there is a need to provide a solution for automatically performing dynamic control of massively scalable, multi-tier processing systems.

SUMMARY

The present teaching relates to methods, systems, and programming for dynamic control of a multi-tier processing system.

In one example, a method implemented on at least one machine each having at least one processor, storage, and a communication platform connected to a network for control of a processing system having a plurality of tiers is disclosed. Queue lengths of a plurality of nodes in one of the plurality of tiers are obtained. A control objective is received from a higher tier. One or more requests from the higher tier are processed by the plurality of nodes in the tier. A control model of the tier is computed based on the received queue lengths. One or more parameters of the control model are adjusted based on the received control objective. At least one control action is determined based on the control model and the control objective.

In a different example, a system for dynamic control of a processing system having a plurality of tiers includes a sensing module, an optimization module, a computation module, and an action module. The sensing module is configured to obtain queue lengths of a plurality of nodes in one of the plurality of tiers. The optimization module is configured to receive a control objective from a higher tier. One or more requests from the higher tier are processed by the nodes in the tier. The computation module is configured to compute a control model of the tier based on the received queue lengths. One or more parameters of the control model are adjusted based on the received control objective. An action module is configured to determine at least one control action based on the control model and the control objective.

Other concepts relate to software for dynamic control of a multi-tier processing system. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for dynamic control of a processing system having a plurality of tiers, wherein the information, when read by the machine, causes the machine to perform a series of steps. Queue lengths of a plurality of nodes in one of the plurality of tiers are obtained. A control objective is received from a higher tier. One or more requests from the higher tier are processed by the plurality of nodes in the tier. A control model of the tier is computed based on the received queue lengths. One or more parameters of the control model are adjusted based on the received control objective. At least one control action is determined based on the control model and the control objective.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teaching.

The present disclosure describes method, system, and programming aspects of dynamic control of multi-tier systems. Such method and system provide an environment for coordinated scaling and elasticity across multiple tiers. The method and system apply coordinated management of queue lengths, latency and throughput across multiple tiers and scale each tier such that overall throughput and latency objectives are met. The method and system can scale multi-tier, massively scaled systems elastically and with good economics using the same infrastructure. For example, as latencies observed at the higher tiers are provided to the lower tiers, which provide services to the higher tiers, the control models used by each tier may be continuously optimized to meet the service-level agreement (SLA) and latency objectives offered to the higher tiers.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
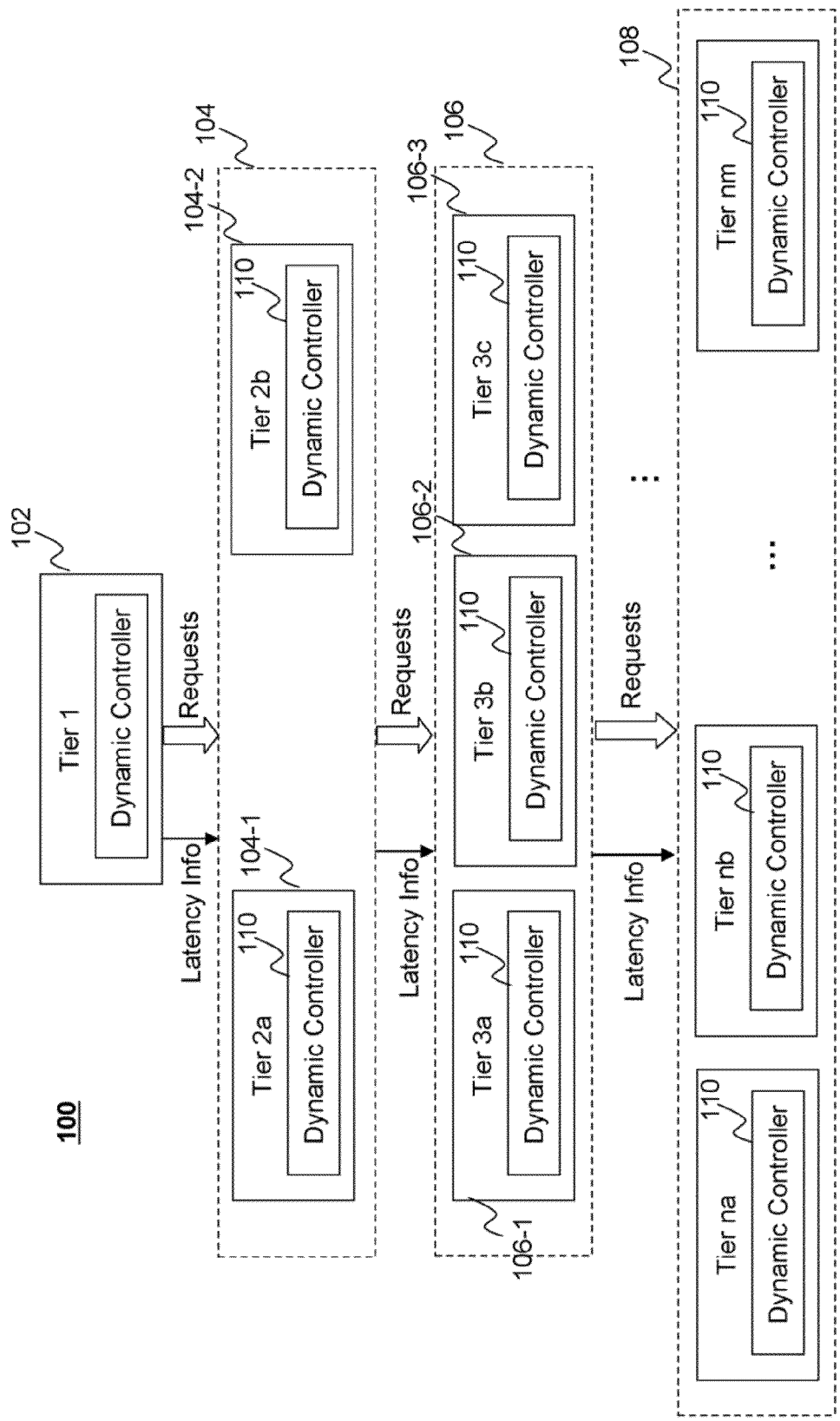
FIG. 1 depicts an exemplary multi-tier processing system having dynamic controllers according to an embodiment of the present teaching.

FIG. 1 depicts an exemplary multi-tier processing system having dynamic controllers according to an embodiment of the present teaching. The multi-tier processing system 100 may be, for example, any suitable distributed serving system such as a web request serving system. Each job served by the multi-tier processing system 100 may need to go through multiple tiers in order to be processed. In this example, the multi-tier processing system 100 includes a plurality of tiers 102, 104, 106, 108. Each tier 102, 104, 106, 108 may be a set of the same software running on different physical machines, which process a certain class of requests. In the present teaching, each of the same software and its associated resources (e.g., software and/or hardware resources) will be described as a node. In this example, each node may be considered as a service end point of a request processing system. In one example, the first tier 102 may be a business continuity tier, and each node in the first tier 102 has identical software performing the function of business continuity on the received requests. In another example, the second tier 104 may make decisions based on content associated with each request, and each node of the second tier 104 has identical software performing such function. In still another example, the third tier 106 may make decision based on the object/purpose of each request, and each node of the third tier 106 has identical software performing such function. In yet another example, the nth tier 108 may retrieve data associated with each request from data storage.

As shown in FIG. 1, requests are passed through tiers from the top tier to the bottom tier. Each request from the higher tier is processed by the nodes in the lower tier. That is, each tier of the multi-tier processing system 100 provides services to the higher tier. In addition, each tier may include one or more sub-tiers, such as Tier 2a 104-1 and Tier 2b 104-2 in the second tier 104, and Tier 3a 106-1, Tier 3b 106-2, and Tier 3c 106-3 in the third tier 106. Sub-tiers may be organized based on locations where the nodes reside. For example, all the nodes in Tier 2a 104-1 may locate in a data center in U.S., while all the nodes in Tier 2b **104-*b*** may locate in another data center in Asia. A route (not shown) may be provided to each tier to determine which sub-tier a request from the higher tier goes to.

In this example, each node has a request queue and its own service rate. The queue length of each node depends on arrival rate and service rate of the requests. Also, tiers in the multi-tier processing system 100 have SLAs for latency. Latency is related to queue length, and in general queue length of nodes in tiers is a potential predictor of overall system latency. As shown in FIG. 1, latency information of each tier is provided to the lower tier and may be used to determine a control objective. In one example, the latency information may include latency miss which is defined as a miss of the long-tail latency contracts against the SLAs. The long-tail latency contract may be defined or marked as % latency contract. For example, a 90, 95, or 99% latency contract may be used.

In this example, the multi-tier processing system 100 includes dynamic controllers 110 for dynamically scaling each tier based on collected queue lengths of each node and latency information from higher tiers in order to meet certain control objectives. In this example, each sub-tier includes a dynamic controller 110 for scaling the respective sub-tier. It is understood that in other examples, each tier may include only one dynamic controller 110 for controlling all the sub-tiers in the same tier. Each dynamic controller 110 is configured to gather information about queue lengths at each node of the respective tier and also accepts a control objective from the higher tier. The control objective may be determined based on service latencies observed by the higher tier and include, for example, minimizing latency of the higher tier, meeting SLA of the higher tier, or maintaining arrival rate lower than service rate at each node. Each dynamic controller 110 is capable of computing a control model based on the received queue lengths and optimizing the parameters of the control model based on the control objective received from the higher tier. Each dynamic controller 110 is further configured for determining a suitable control action to scale the respective tier based on the computed control model and the control objective.

Figure 2:
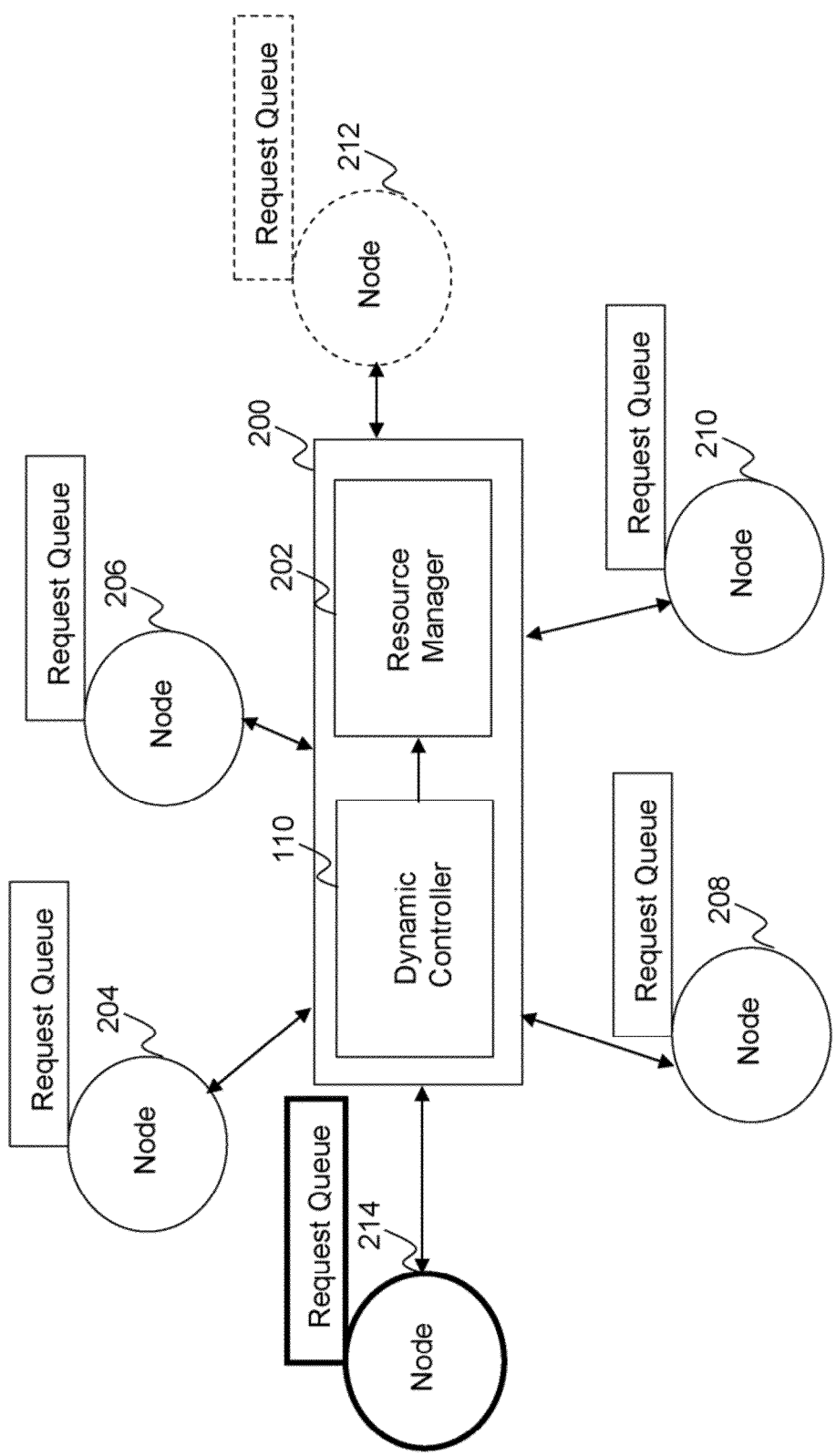
FIG. 2 is an exemplary diagram of a system having a dynamic controller and a resource manager according to an embodiment of the present teaching.

FIG. 2 is an exemplary diagram of a system having a dynamic controller and a resource manager according to an embodiment of the present teaching. In this example, the system 200 scales a given tier of the multi-tier processing system 100 by the dynamic controller 110 and a resource manager 202. In this example, the control action determined by the dynamic controller 110 is executed by the resource manager 202 to scale the tier. For example, the tier may include nodes 204, 206, 208, 210, 212, each of which has its own request queue. In one example, the dynamic controller 110 may determine that this tier can be scaled down as the latency from the higher tier is well-below SLA and thus instruct the resource manager 202 to remove the node 212 from the tier. In another example, the dynamic controller 110 may determine that the tier needs be scaled up as the latency from the higher tier does not meet its SLA and thus instruct the resource manager 202 to add a new node 214 to the tier. In addition, the resource manager 202 may also restrict the control domain of the dynamic controller 110. For example, if the resource manager 202 is adding the new node 214, the newly added node 214 may be excluded from control cycles for a certain time period.

Figure 3:
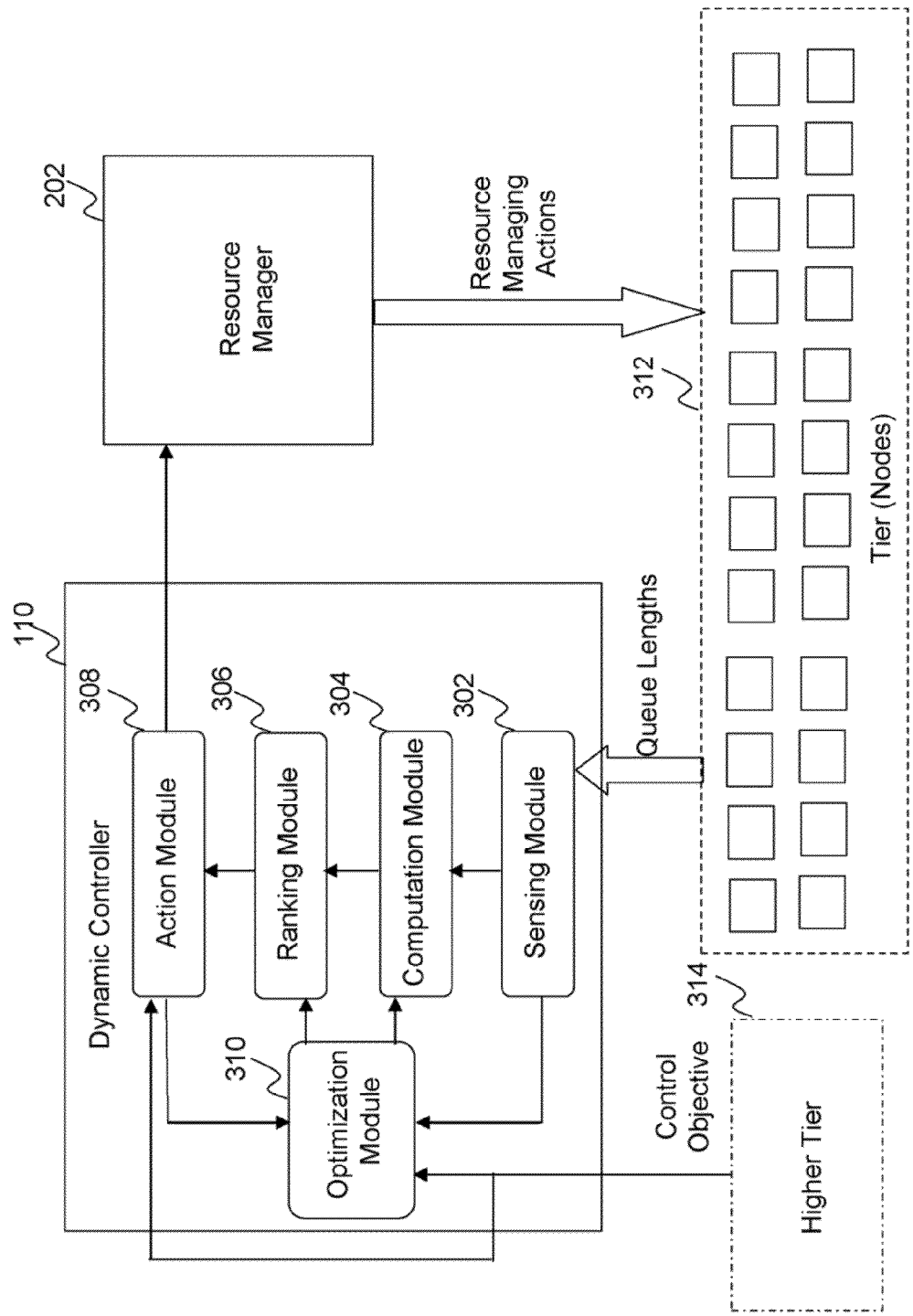
FIG. 3 is an exemplary system diagram of the dynamic controller shown in FIG. 2 according to an embodiment of the present teaching.

FIG. 3 depicts an exemplary diagram of the dynamic controller according to an embodiment of the present teaching. In this example, the dynamic controller 110 includes a sensing module 302, a computation module 304, a ranking module 306, an action module 308, and an optimization module 310. The sensing module 302 is configured to obtain queue lengths from a plurality of nodes in one tier 312 of the multi-tier processing system 100. That is, the sensing module 302 gathers the node-specific and tier-wide queue length data in a predetermined time interval (control cycle). In general, the smaller the granularity and the greater the timeliness of data fed into the sensing module 302, the greater the ability of the dynamic controller 110 to perform control actions. In this example, the time interval for updating the queue length data is 5 minutes. For example, each node may collect the queue lengths for a 5-minute window and adds them to the previous value by applying decay as follows:

$$\text{Queue length} = \text{decay\_fraction} \times \text{Queue length} + (1 - \text{decay\_fraction}) \times \text{Queue length}_{5\ min} \quad (1)$$

The default value of decay_fraction may be, for example, 0.8. The slow decay is used to prevent short-term variation in request rate. It is understood that the time window for sampling may not be predetermined or fixed in other examples. In those examples, the sensing module 302 may passively receive the queue length data and record the last time the data arrives. As such, the sensing module 302 may calculate each individual time difference and use it as the time interval for the analysis performed by the dynamic controller 110. In other words, in those examples, the time window may vary from time to time, depending on how fast or slow the queue length data arrives.

In this example, the computation module 304 is operatively coupled to the sensing module 302. The computation module 304 is configured to compute a deviance for node based on a control model and the received queue lengths. Various control models based on different statistical moments, such as but not limited to mean, variance, median, percentile, etc., may be used to deduce the control actions.

Figure 4A:
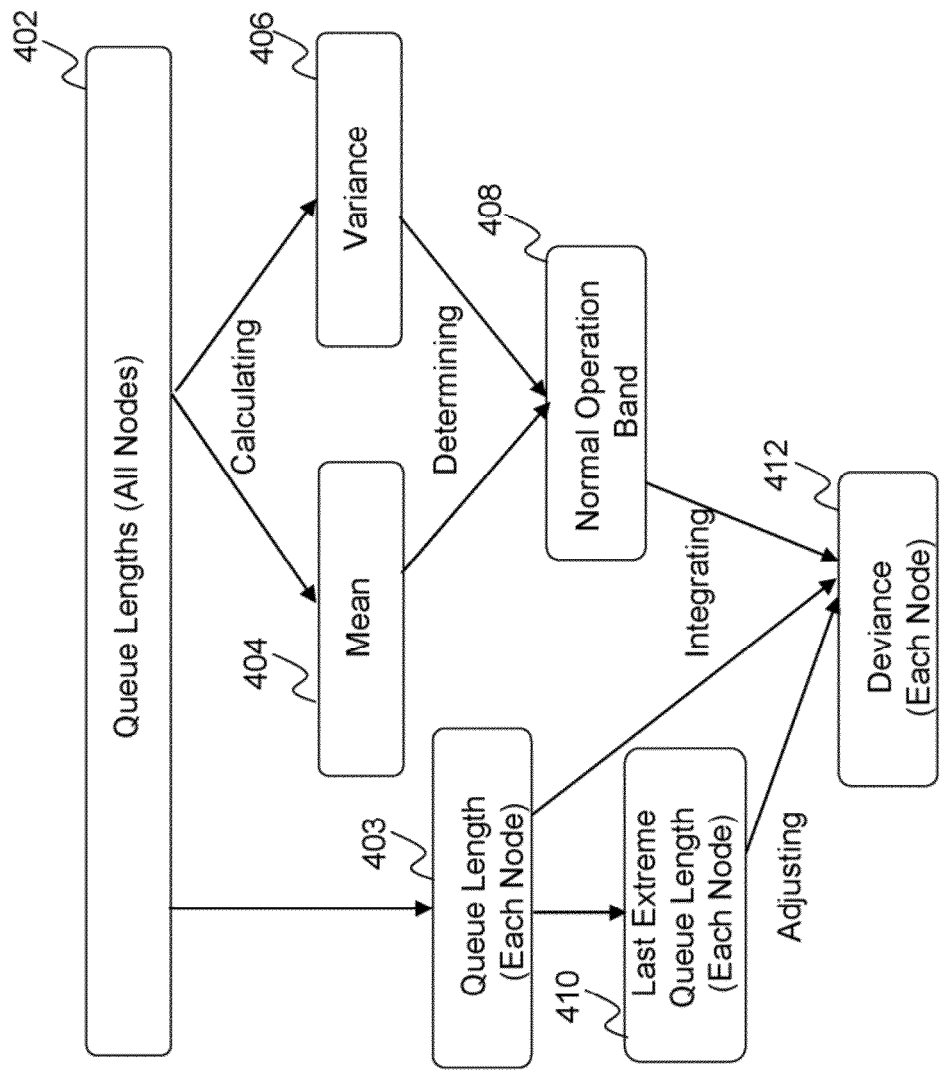
FIGS. 4(a)-4(c) are depictions of exemplary control models according to different embodiments of the present teaching.

FIG. 4(a) illustrates one exemplary control model based on mean and variance. In this example, in computing the deviance for each node, the computation module 304 is configured to calculate a mean 404 and a variance 406 of the tier 312 based on the received queue lengths 402 (tier-wide queue length data). Each queue length 403 for one node u may be represented by $Q_u(t)$ as a function of time t. The mean 404 and variance 406 may be represented by functions $\text{MEAN}_F(Q_u(t))$ and $\text{VAR}_F(Q_u(t))$, respectively, over all nodes in a given tier 312 F over some window of time $\Delta t$. As noted above, the window of time $\Delta t$ is a configurable model parameter. In one example, the window of time $\Delta t$ may be 5 minutes. The mean 404 and variance 406 may be calculated using some kind of decay model to dampen out variations over short periods of time. It is understood that, in other examples, a different time interval and/or decay model may be implemented to compute the mean 404 and variance 406. It is also understood that, the time interval for sampling may not be predetermined or fixed in other examples. In those examples, the sensing module 302 may passively receive the queue length data and record the last time the data arrives. As such, the sensing module 302 may calculate each individual time difference and use it as the time interval for the analysis performed by the dynamic controller 110. In other words, in those examples, the time window may vary from time to time, depending on how fast or slow the queue length data arrives.

Next, in this example, the computation module 304 is further configured to determine a normal operation band (NoB) 408 based on the calculated mean 404 and variance 406. NoB 408 is a band of queue length variation for which the dynamic controller 110 may not issue any control action. In this example, NoB 408 may be defined based on the tier-wide queue length mean 404 and variance 406, using $2c_1$ to indicate the width of the band in units of variance.

$$\text{NoB} = (\text{MEAN}_F - c_1 \cdot \text{VAR}_F, \text{MEAN}_F + c_1 \cdot \text{VAR}_F) \quad (2)$$

$\text{MEAN}_F + c_1 \cdot \text{VAR}_F$ is the upper bound of the band, and $\text{MEAN}_F - c_1 \cdot \text{VAR}_F$ is the lower bound of the band. In one example, NoB 408 may be determined by the Gaussian distribution. For example, if $c_1$ equals to 1, then the band covers 68.26% of cases closest to the mean 404.

Further, in this example, the computation module 304 is configured to determine a deviance 412 for each node based on NoB 408 and a last extreme queue length 410 of the respective node u observed in the window of time $\Delta t$. In order to prevent actions that are too hasty, the deviance 412 is calculated for any given node u as a measure of persistence in operating outside NoB 408. For queue lengths above the upper bound of NoB 408, the calculation of deviance 412 is as follows:

$$\text{DevianceUpper} = \Delta t \cdot (Q_u(t) - (\text{MEAN}_F + c_1 \cdot \text{VAR}_F)) + \Delta t \cdot (Q_u(t) - \text{Max}(Q_u)) \cdot (1 - \text{sign}(Q_u(t) - Q_u(t - \Delta t)))/2 \quad (3)$$

Where the term $\text{Max}(Q_u)$ refers to the last maximum queue length of $Q_u(t)$ of a node u received by the sensing module 302. The computation module 304 continuously determines a deviance 412 for each node. Thus, if a queue length returns to NoB 408 before this last inequality condition is satisfied, the computation module 304 may stop calculating Deviance Upper for that node. For queue lengths that go below NoB 408, a similar, complementary calculation may be performed as follows:

$$\text{DeivianceLower} = \Delta t \cdot (Q_u(t) - (\text{MEAN}_F - c_1 \cdot \text{VAR}_F)) + \Delta t \cdot (Q_u(t) - \text{Min}(Q_u)) \cdot (1 + \text{sign}(Q_u(t) - Q_u(t - \Delta t)))/2 \quad (4)$$

Where the term $\text{Min}(Q_u)$ refers to the last minimum queue length of $Q_u(t)$ of a node u received by the sensing module 302.

The above calculations can be done for all nodes and an ordering among them can be created by its results. A single equation can perform both calculations in one expression as follows:

$$\text{LoadDeviance} = (1 + \text{sign}((Q_u(t) - (\text{MEAN}_F + c_1 \cdot \text{VAR}_F))) \text{DevianceUpper}/2 + (1 - \text{sign}((Q_u(t) - (\text{MEAN}_F - c_1 \cdot \text{VAR}_F))) \text{DevianceLower}/2 \quad (5).$$

Figure 5A:
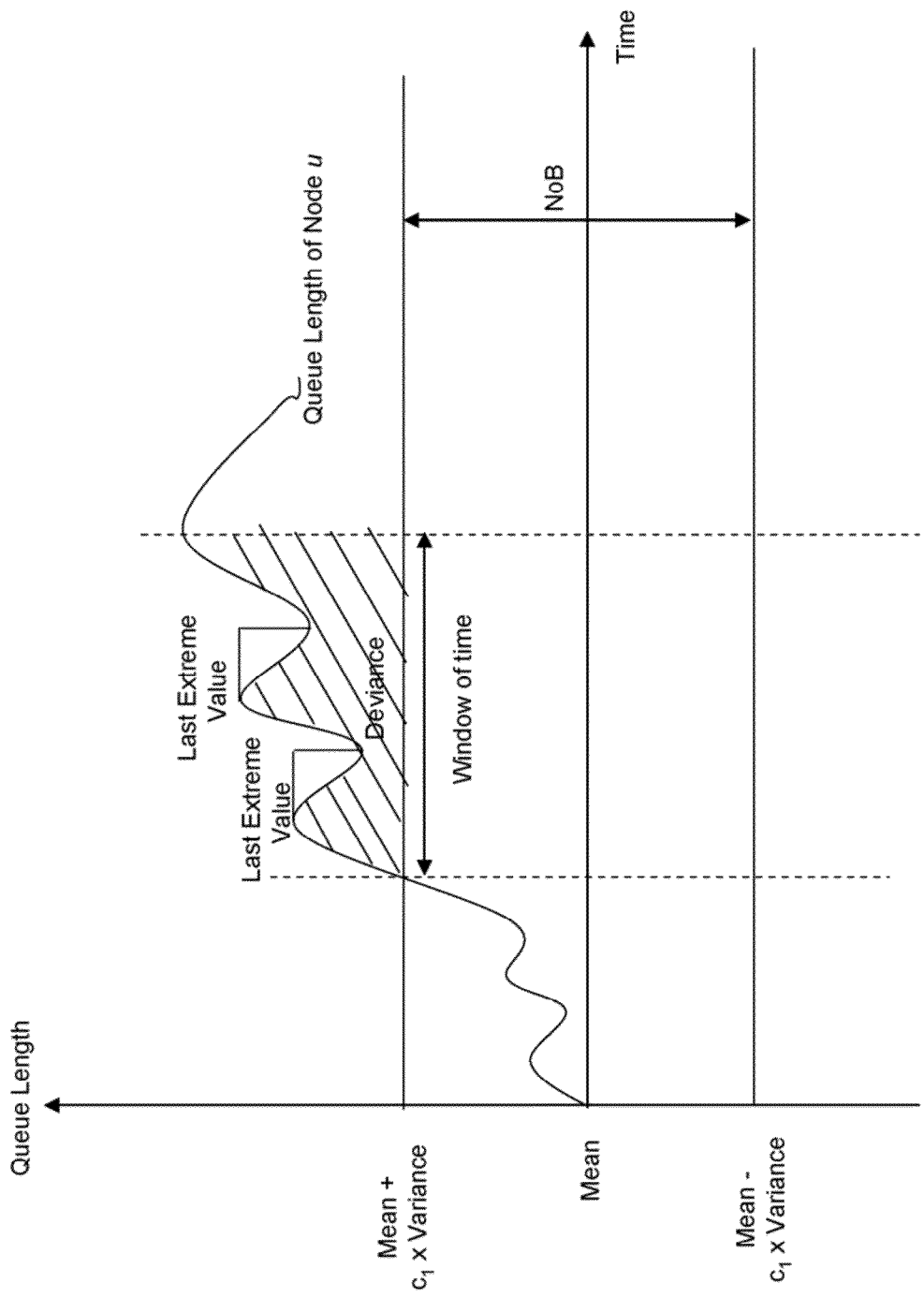
FIGS. 5(a) and 5(b) depict exemplary examples of computing a deviance for a node according to different embodiments of the present teaching.

FIG. 5(a) further illustrates one example of determining a deviance for a node based on NoB and a last extreme queue length of a node. The queue length of a node u changes with respect to time. In a given sampling time window, the shaded area above the base line defined by the mean, variance, and model parameter $c_1$ is computed by integration, which corresponds to $\Delta t \cdot (Q_u(t) - (\text{MEAN}_F + c_1 \cdot \text{VAR}_F))$ in Equation (3). As noted above, the computation module 304 keeps track of the last-observed extreme value of the queue length for each node and uses the last extreme queue length as a "differential reward" for adjusting the integral area to obtain the deviance. The differential reward adjustment applies to nodes that shed queue length on their own or lose queue length through other processes (such as fewer client requests) in order to prevent them from being tagged for a control action too early. Knowing the last extreme value is the same as knowing the average differential of queue length since the last such observation of such *minima* or maxima. The differential reward adjustment corresponds to $\Delta t \cdot (Q_u(t) - \text{Max}(Q_u)) \cdot (1 - \text{sign}(Q_u(t) - Q_u(t - \Delta t)))/2$ in Equations (3) above. Although FIG. 5(a) shows an example of a node above the NoB, it is understood that the same idea can be applied to nodes below NoB in view of Equations (4) above. From control theory perspective, the exemplary control model shown in FIGS. 4(a) and 5(a) may be viewed as an improved proportional-integral-derivative (PID) controller, where NoB (baseline) represents the proportional aspect, the integral shaded area represents the integral aspect, and the differential reward adjustment represents the derivative aspect of the classical PID controller.

Figure 4B:
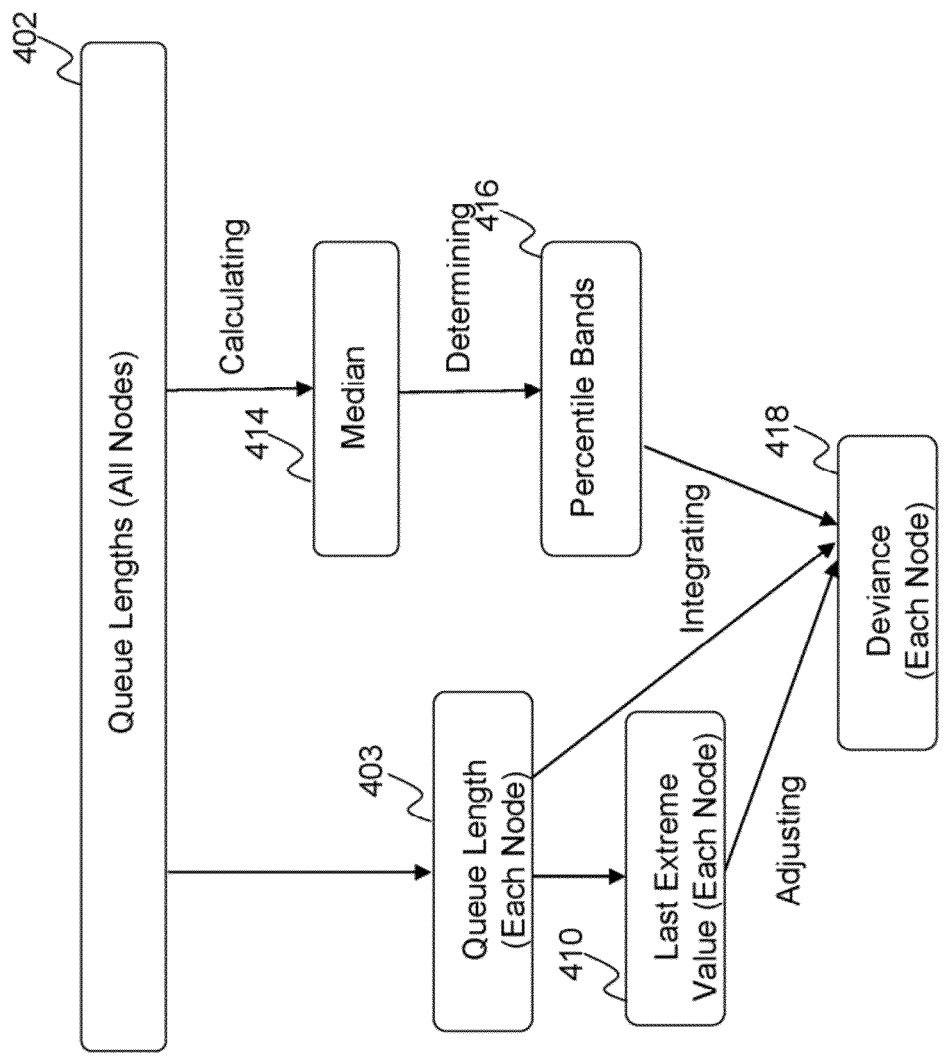

FIG. 4(b) illustrates another exemplary control model based on median. In this example, in computing the deviance for each node, the computation module 304 is configured to calculate a median 414 of the tier 312 based on the received queue lengths 402 (tier-wide queue length data). The computation module 304 is further configured to determine a plurality of percentile bands 416 based on the calculated median 414 using approaches such as population analysis. Referring now the FIG. 5(b), for example, percentile bands may be defined by the calculated median and 10% percentile lines. It is understood that the width of each percentile band and the total number of percentile bands may vary in other examples. Referring back to FIG. 4(b), in this example, the computation module 304 is configured to determine a deviance 418 for each node based on at least some of the percentile bands 416 and a last extreme queue length 410 of the respective node observed in the sampling time window.

Figure 5B:
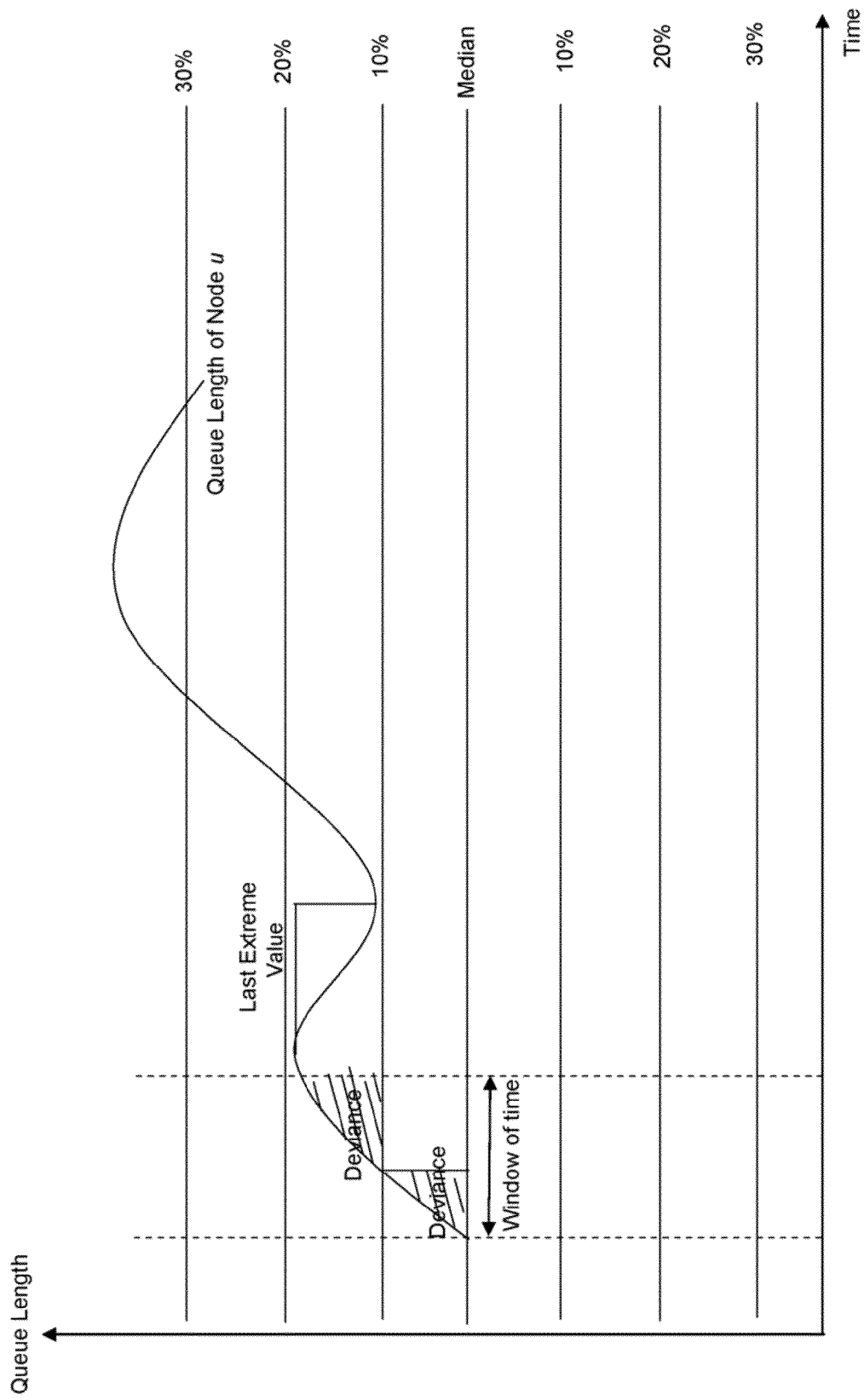

FIG. 5(b) illustrates one example of determining a deviance for a node based on percentile band and the last extreme queue length of the node. Instead of using NoB determined by mean and variance as the base line for integration, in this example, the percentile bands are used to calculate the queue length integrals with respect to each percentile line (percentile boundary) in the time window. Separate integrals may be calculated for each percentile band for a given node. Thus, the determined variance for each node in this example may be represented by a vector having multiple elements, each representing one integral value from one percentile band. Alternatively, the median (0 percentile line), instead of each percentile line, may be used as a common base line for integration in other examples. In those examples, instead of getting a vector, the deviance may be represented as a single value for each node. Nevertheless, similar to the example in FIG. 5(a), the computation module 304 keeps track of the last-observed extreme value of the queue length for each node and uses the last extreme queue length as a "differential reward" for adjusting the integral area(s) to obtain the deviance.

Figure 4C:
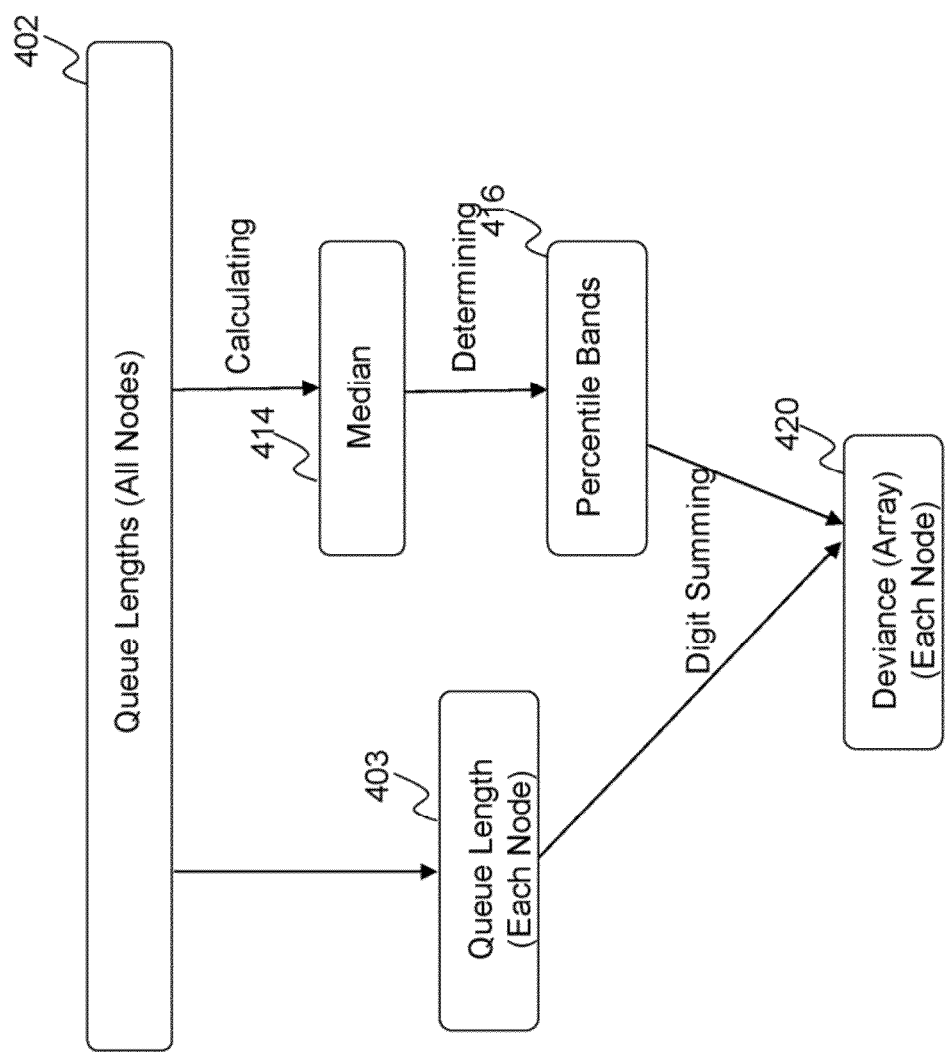

FIG. 4(c) illustrates still another exemplary control model based on median. In this example, in computing the deviance for each node, the computation module 304 is configured to calculate a median 414 of the tier 312 based on the received queue lengths 402 (tier-wide queue length data). The computation module 304 is further configured to determine a plurality of percentile bands 416 based on the calculated median 414 using approaches such as population analysis. Referring now the FIG. 5(b), for example, percentiles bands may be defined by the calculated load median and 10% percentile lines. Referring back to FIG. 4(c), in this example, the computation module 304 is configured to determine a deviance 420 for each node based on at least some of the percentile bands 416 using a digit summation approach. Different from the example in FIGS. 4(b) and 5(b) where each element in the vector is an "accurate" estimate of the area occupied by the graph in a percentile band (with differential reward adjustment), in this example, the value of each element is an integer that is incremented every time the queue length is found within that band (without differential reward adjustment). It is understood that, however, as the number of percentile bands increases, the difference in information content between the examples in FIGS. 4(b) and 4(c) may gradually disappear.

In this example, instead of using integrals adjusted by differential rewards as shown in FIGS. 4(a) and 4(b), a load percentile array, including a plurality of elements, is determined by incrementing an array element based on a percentile band into which the queue length dimension falls into. For example, a queue length percentile array ($e_l$, $e_1$, $e_2$, $e_3$, $e_4$, $e_5$, $e_6$, $e_7$, $e_8$, $e_h$) may include eight elements $e_1$ to $e_8$ corresponding to −40%, −30%, −20%, −10%, 10%, 20%, 30%, and 40% percentile bands, respectively, and two elements $e_l$ and $e_h$ corresponding to lower and higher bands capturing the long tails. It is understood that the width of each percentile band and the total number of percentile bands may vary in other examples, so may the number of elements in the queue length percentile array. Depending on where the queue length of the node resides in the sampling time window, the corresponding element value in the queue length percentile array is incremented. In other words, digit summation approach may be applied to determine the queue length percentile array. In one example, if the queue length of a node is in the 40% band, then $e_8$ is incremented $e_8=e_8+1$; if the queue length of the node changes to the −40% band, then $e_1$ is incremented $e_1=e_1+1$. In this example, the queue length percentile array may be used as the deviance for each node to determine the appropriate control action.

Referring back to FIG. 3, in this example, the ranking module 306 is operatively coupled to the computation module 304. The ranking module 306 is configured to rank all the nodes in the tier 312 based on the deviances. As noted above, the deviance may be determined in the form of a single value or a vector/array depending on the selected control model. In one example, if the deviance is represented as a single value, the value may be used to rank the nodes. In another example, if the deviance is represented as a vector/array having multiple elements, the ranking may be based on each element of the vector/array or based on composite ordering of some or all elements in the vector/array (a weight may be applied to each element in the vector/array in composite ordering). In ranking the plurality of nodes in the tier 312, the ranking module 306 may be configured to remove any nodes that were previously applied to a control action within a predetermined time period (cooling period) from the ranking. The cooling period allows nodes to stabilize before considering them for another control action. Optionally, the ranking module 306 may also ignore nodes that were recently rebooted, or if they report stale data.

In this example, the action module 308 is operatively coupled to the ranking module 306. The action module 308 is configured to determine at least one control action based on the control model and control objective. As mentioned above, the control objective from the higher tier 314 is received by the dynamic controller 110. The control objective may include, for example, latencies observed by the higher tier 314 and may be used by the action module 308 in conjunction with the control models computed by the computation module 304 to determine the suitable control action. In one example, if the action module 308 determines that the latency of the higher tier 314 is above a threshed value (e.g. determined based on SLA) and that the queue lengths of this tier 312 are also above a threshed value, then a control action of adding a new node to the tier 312 may be determined. In another example, if the action module 308 determines that the latency of the higher tier 314 is well below SLA and that the queue lengths of this tier 312 are also below a threshed value, then a control action of removing a node from the tier 312 may be determined. The particular node to be removed may be determined based on the ranking made by the ranking module 306, e.g., the node at the bottom of the ranking. In this example, the determined control actions are carried out by the resource manager 202. The resource manager 202 may be a central assignment controller that registers the mapping from job requests to nodes. Resource managing actions may be executed by the resource manager 202 and applied to the corresponding node(s) in the tier 312.

The dynamic controller 110 operates at relatively regular intervals, i.e., control cycles. In this example, a full control cycle is one complete run through the sensing module 302, computation module 304, ranking module 306, and action module 308. The control cycle frequency may vary from tiers to tiers. In this example, higher tiers have less frequent control cycles as the lower tiers which provide services to the higher tiers. Control cycle frequency at each tier may be one of the configurable parameters of the control model and selected depending on the number of control actions available to the multi-tier processing system 100 per unit of time. The number of control actions per unit of time may be an inherent physical characteristic of the multi-tier processing system 100. For robustness purposes, the number of control cycles per unit of time may not be lower than the maximum number of control actions available in that unit of time.

Figure 6:
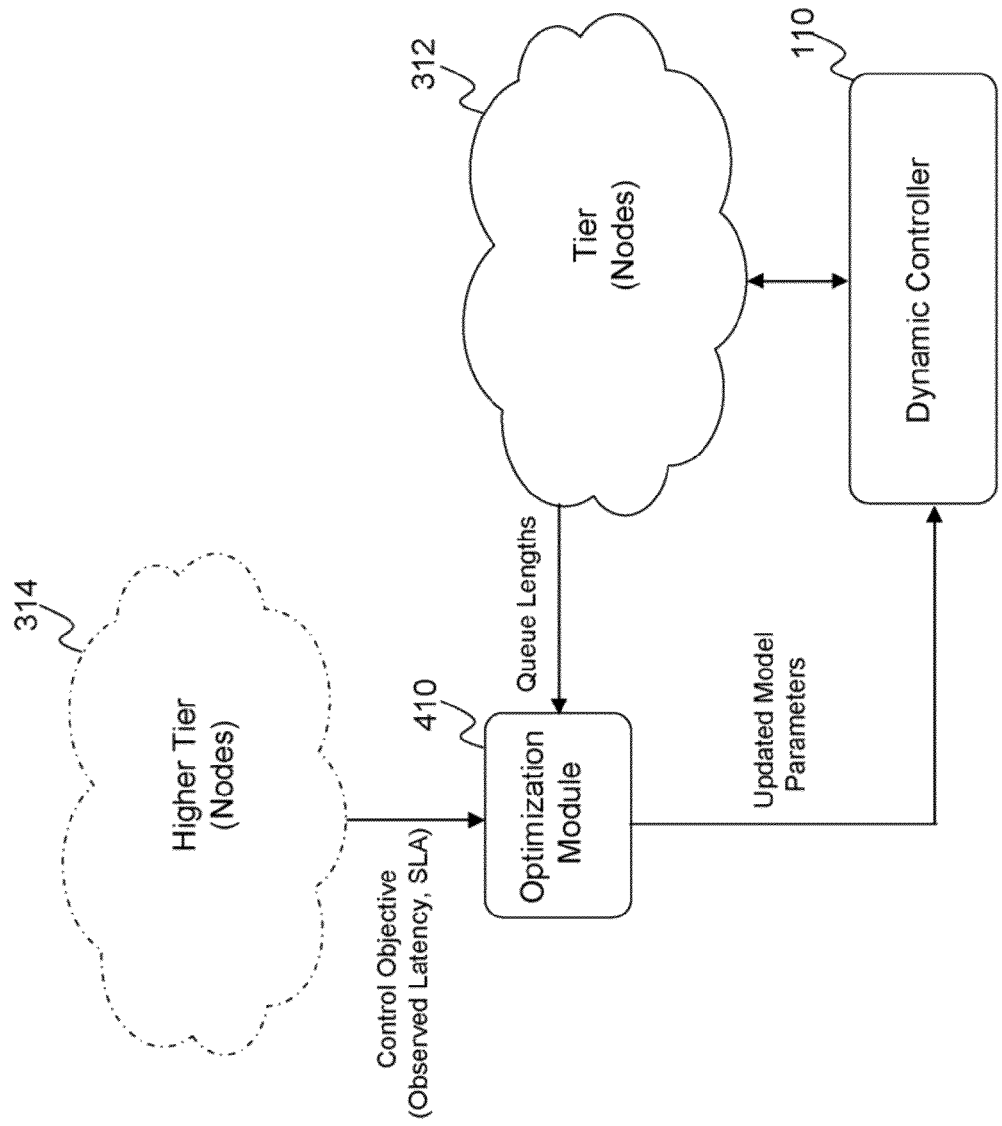
FIG. 6 is a depiction of an exemplary optimization module of the dynamic controller according to an embodiment of the present teaching.

In this example, the dynamic controller 110 further includes an optimization module 310 operatively coupled to the sensing module 302, the computation module 304, the ranking module 306, and the action module 308. The optimization module 310 is configured to receive the control objective from the higher tier 314 and adjust parameters of the control model based on the control objective. The optimization module 310 may apply an automatic mechanism to learn and/or search for the optimal values of various configuration parameters such as model parameters $c_1$, $c_2$, W, control cycle frequency, and paramedic smoothing factors. In one example as shown in FIG. 6, in reinforcement learning, the queue lengths of a given tier 312 and the control objective from the higher tier 314 are combined with a feedback control loop. In order to learn optimal configuration parameters, desirable system behavior with respect to the control objective from the higher tier 314 may be determined and applied to the optimization module 310. The control objective includes, for example, minimizing latency of the higher tier 314, meeting SLA of the higher tier 314, and maintaining arrival rate lower than service rate for each node in the higher tier 314. Some initial values of the model parameters may be selected based on the physical meaning of these parameters, as given in the exemplary control models noted above. Over time, updated configuration parameters may be set in order to move the system towards the desirable system behavior. One metric may be necessary is the "distance" to the desirable system behavior (control error signal). In one example, the control error signal may include the difference between the measured latency probabilities of the higher tier 314 and the expected latency % SLAs. In another example, the control error signal may include the difference between the measured queue length and the maximum capacity derived from historical latency results. Gradient descent techniques and the control error signal may be used to optimize and update the configuration parameters. It is understood that any other suitable optimization algorithm may be used by the optimization module 310 to discover more optimal configuration parameters.

Figure 7:
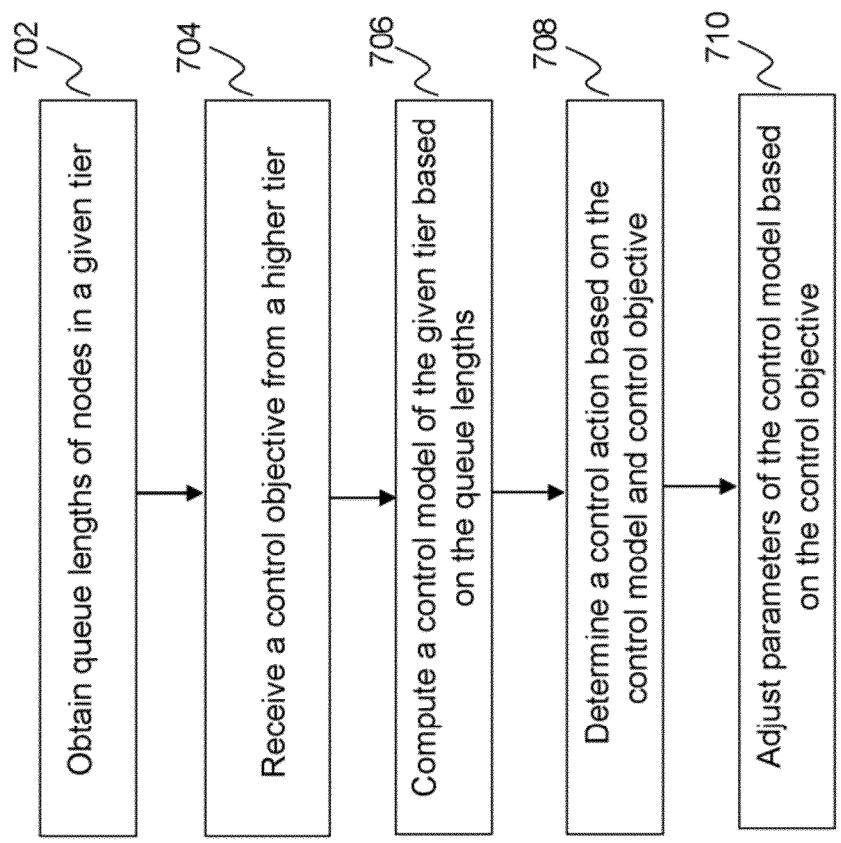
FIG. 7 is a flowchart of an exemplary process of dynamic control of the multi-tier system according to an embodiment of the present teaching.

FIG. 7 is a flowchart of an exemplary process of dynamic control of the multi-tier system according to an embodiment of the present teaching. Beginning at block 702, queue lengths of the nodes in each tier are received. That is, node-specific and tier-wide queue length data is gathered. As described above, this may be performed by the sensing module 302 of the dynamic controller 110. At block 704, processing may continue where a control objective is received from a higher tier. Requests from the higher tier are processed by the nodes in the lower tier. In other words, each tier provides services to the higher tier. The control objective may be determined based on latency information of the higher tier and may include, for example, minimizing latency of the higher tier, meeting SLA of the higher tier, and maintaining arrival rate lower than service rate at each node of the higher tier. As described above, this may be performed by the optimization module 310 of the dynamic controller 110. At block 706, a control model of each tier is computed based on the received queue lengths thereof. Various control models based on different statistical moments, such as but not limited to mean, variance, median, percentile, etc., may be computed. As described above, this may be performed by the computation module 304 of the dynamic controller 110. Proceeding to block 708, at least one control action is determined based on the control model and the control objective. The control action includes adding a node to each tier and removing a node from each tier. As described above, this may be performed by the action module 308 of the dynamic controller 110. At block 710, parameters of the control model are adjusted based on the received control objective. The parameters may include a control cycle frequency determined based on the number of available control actions per unit of time. In one example, a control cycle frequency of a lower tier is higher than a control cycle frequency of a higher tier. As described above, this may be performed by the optimization module 310 of the dynamic controller 110.

Figure 8:
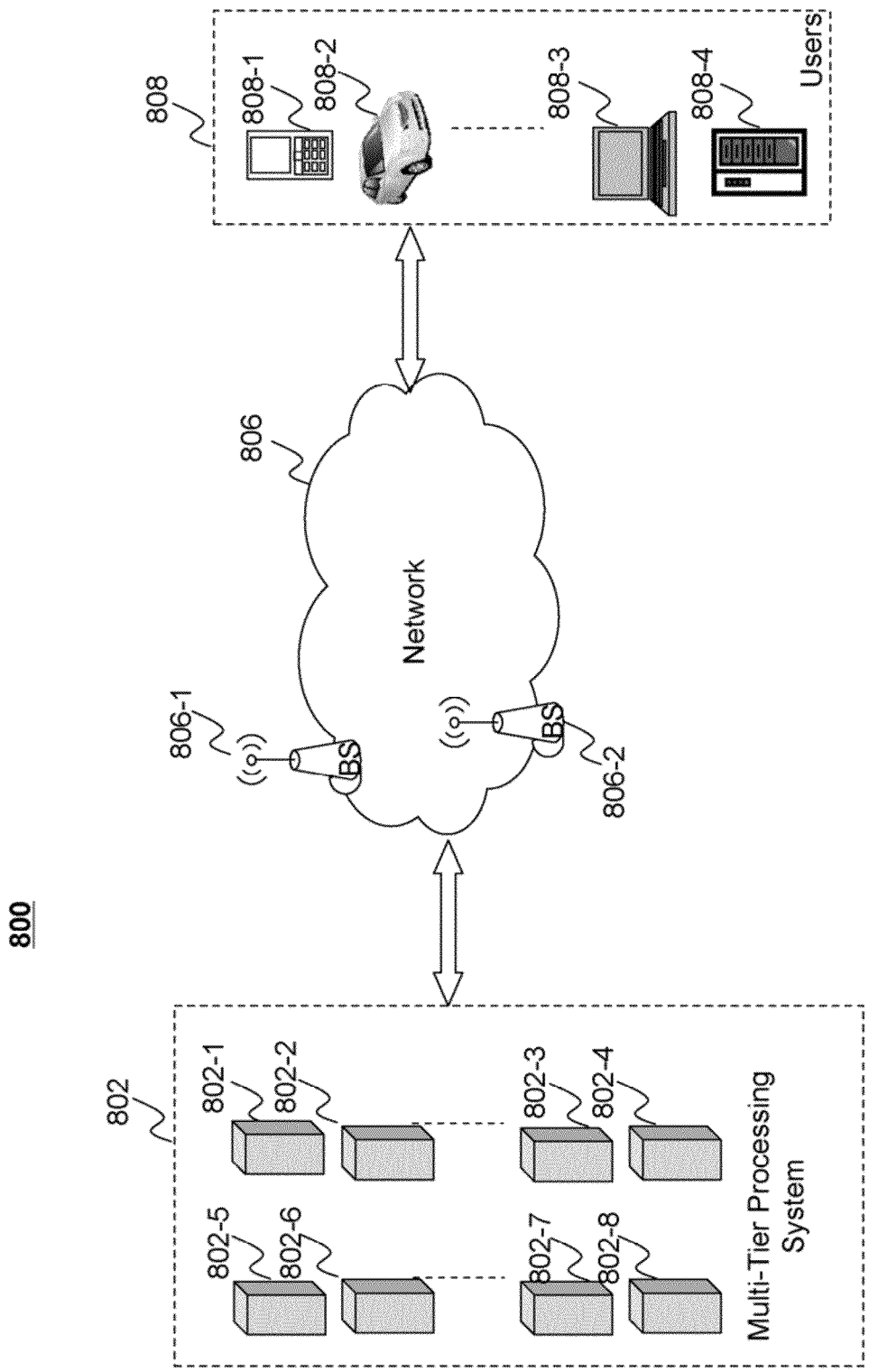
FIG. 8 is an exemplary network environment in which the system for dynamic control of a multi-tier processing system can be implemented according to an embodiment of the present teaching.

FIG. 8 is an exemplary network environment in which the system for dynamic control of a multi-tier processing system can be implemented according to an embodiment of the present teaching. In this example, the exemplary network environment 800 includes a multi-tier processing system 802, a network 806, and users 808. The network 806 may be a single network or a combination of different networks. For example, the network 806 may be a local area network (LAN), a wide area network (WAN), a public network, a private network, a proprietary network, a Public Telephone Switched Network (PSTN), the Internet, a wireless network, a virtual network, or any combination thereof. The network 806 may also include various network access points, e.g., wired or wireless access points such as base stations or Internet exchange points 806-1, . . . , 806-2, through which a data source may connect to the network 806 in order to transmit information via the network 806.

The multi-tier processing system 802 in which dynamic control to be performed may include a plurality of nodes 802-1, 802-2 . . . 802-7, 802-8, which communicate through the network 806 or through an internal network (not shown). The nodes 802-1, 802-2 . . . 802-7, 802-8 are arranged in multiple tiers, each of which may be a set of the same software installed on autonomous physical machines, such as servers, workstations, desktop or laptop computers, tablets, smart phones, televisions, game consoles, or any other suitable machines. Some or all of the nodes 802-1, 802-2 . . . 802-7, 802-8 may include software installed on parallel virtual machines implemented by either software emulation or hardware virtualization. The multi-tier processing system 802 may be implemented on a set of machines owned by one entity, e.g., an enterprise, and maintained as a server farm or server cluster where the servers are mounted on racks in a server room or data center. The multi-tier processing system 802 may also be implemented on machines owned by different entities and that are physically separate from each other at a distance. In this example, the multi-tier processing system 802 is a highly distributed, scalable and elastic processing system in which the number of nodes in each tier may be dynamically changed, thereby dynamically controlling the queue lengths and latencies across multiple tiers.

Users 808 may be of different types such as users connected to the network 806 via desktop connections 808-4, users connecting to the network 806 via wireless connections such as through a laptop 808-3, a handheld device 808-1, or a built-in device in a motor vehicle 808-2. A user may access to the multi-tier processing system 802 by sending a request to the multi-tier processing system 802 via the network 806 and receiving a result from the multi-tier processing system 802 through the network 806.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 9:
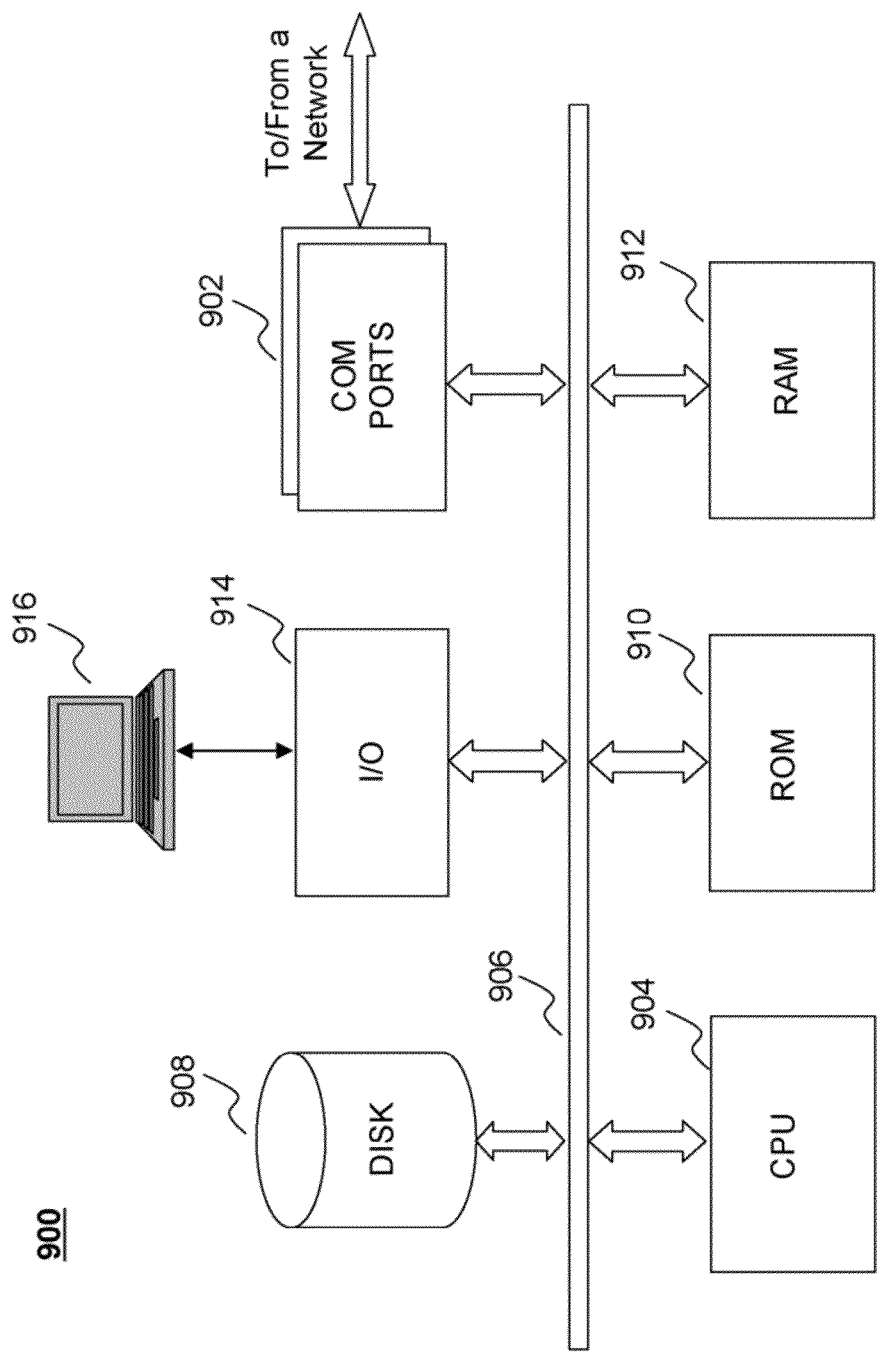
FIG. 9 depicts a general computer architecture on which the present teaching can be implemented.

FIG. 9 depicts a general computer architecture on which the present teaching can be implemented and has a functional block diagram illustration of a computer hardware platform that includes user interface elements. The computer may be a general-purpose computer or a special purpose computer. This computer 900 can be used to implement any components of the dynamic control architecture as described herein. Different components of the system, e.g., as depicted in FIGS. 1-3, can all be implemented on one or more computers such as computer 900, via its hardware, software program, firmware, or a combination thereof. Although only one such computer is shown, for convenience, the computer functions relating to work load balancing may be implemented in a distributed fashion on a number of similar platforms, to distribute the processing load.

The computer 900, for example, includes COM ports 902 connected to and from a network connected thereto to facilitate data communications. The computer 900 also includes a central processing unit (CPU) 904, in the form of one or more processors, for executing program instructions. The exemplary computer platform includes an internal communication bus 906, program storage and data storage of different forms, e.g., disk 908, read only memory (ROM) 910, or random access memory (RAM) 912, for various data files to be processed and/or communicated by the computer, as well as possibly program instructions to be executed by the CPU. The computer 900 also includes an I/O component 914, supporting input/output flows between the computer and other components therein such as user interface elements 916. The computer 900 may also receive programming and data via network communications.

Hence, aspects of the method of dynamic control of a multi-tier processing system, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on at least one machine each having at least one processor, storage, and a communication platform connected to a network for dynamic control of a processing system having a plurality of tiers, the method comprising:
    obtaining queue lengths of a plurality of nodes in one of the plurality of tiers;
    receiving a control objective from a higher tier, wherein one or more requests from the higher tier are processed by the plurality of nodes in the tier;
    computing a control model of the tier based on the obtained queue lengths of the tier, wherein one or more parameters of the control model are automatically optimized based on the received control objective from the higher tier; and
    determining at least one control action based on the control mode and the control objective, wherein
    the steps of obtaining, receiving, computing, and determining are performed in the tier at a frequency that is determined based on a number of control actions available to the processing system per unit of time and that is higher than a frequency at which the steps of obtaining, receiving, computing, and determining are performed in the higher tier.

2. The method of claim 1, wherein the control objective is determined based on latency information of the higher tier.

3. The method of claim 2, wherein the control objective includes at least one of:
    minimizing latency of the higher tier;
    meeting service-level agreement (SLA) of the higher tier; and
    for each of a plurality of nodes in the higher tier, maintaining arrival rate lower than service rate.

4. The method of claim 1, wherein the at least one control action includes at least one of adding a node to the tier and removing a node from the tier.

5. The method of claim 1, wherein the step of computing a control model comprises:
    calculating a mean and a variance of the tier based on the obtained queue lengths;
    determining a normal operation band based on the calculated mean and variance; and
    computing continuously a deviance for each of the plurality of nodes based on the normal operation band and a last extreme queue length.

6. The method of claim 1, wherein the frequency is higher than a maximum number of control actions available to the processing system per unit of time.

7. A system for dynamic control of a processing system having a plurality of tiers, comprising:
    a sensing module configured to obtain queue lengths of a plurality of nodes in one of the plurality of tiers;
    an optimization module configured to receive a control objective from a higher tier, wherein one or more requests from the higher tier are processed by the plurality of nodes in the tier;
    a computation module configured to compute a control model of the tier based on the obtained queue lengths of the tier, wherein one or more parameters of the control model are automatically optimized based on the received control objective from the higher tier; and; and
    an action module configured to determine at least one control action based on the control model and control objective, wherein
    the steps of obtaining, receiving, computing, and determining are performed in the tier at a frequency that is determined based on a number of control actions available to the processing system per unit of time and that is higher than a frequency at which the steps of obtaining, receiving, computing, and determining are performed in the higher tier.

8. The system of claim 7, wherein the control objective is determined based on latency information of the higher tier.

9. The system of claim 8, wherein the control objective includes at least one of:
    minimizing latency of the higher tier;
    meeting SLA of the higher tier; and
    for each of a plurality of nodes in the higher tier, maintaining arrival rate lower than service rate.

10. The system of claim 7, wherein the at least one control action includes at least one of adding a node to the tier and removing a node from the tier.

11. The system of claim 7, wherein the computation module is configured to:
    calculate a mean and a variance of the tier based on the obtained queue lengths;
    determine a normal operation band based on the calculated mean and variance; and
    compute continuously a deviance for each of the plurality of nodes based on the normal operation band and a last extreme queue length.

12. The system of claim 7, wherein the frequency is higher than a maximum number of control actions available to the processing system per unit of time.

13. A machine-readable tangible and non-transitory medium having information recorded thereon for dynamic control of a processing system having a plurality of tiers, wherein the information, when read by the machine, causes the machine to perform the following:
    obtaining queue lengths of a plurality of nodes in one of the plurality of tiers;
    receiving a control objective from a higher tier, wherein one or more requests from the higher tier are processed by the plurality of nodes in the tier;
    computing a control model of the tier based on the obtained queue lengths of the tier, wherein one or more parameters of the control model are automatically optimized based on the received control objective from the higher tier; and
    determining at least one control action based on the control model and the control objective, wherein
    the steps of obtaining, receiving, computing, and determining are performed in the tier at a frequency that is determined based on a number of control actions available to the processing system per unit of time and that is higher than a frequency at which the steps of obtaining, receiving, computing, and determining are performed in the higher tier.

14. The medium of claim 13, wherein the control objective is determined based on latency information of the higher tier.

15. The medium of claim 13, wherein the control objective includes at least one of:
    minimizing latency of the higher tier;
    meeting SLA of the higher tier; and
    for each of a plurality of nodes in the higher tier, maintaining arrival rate lower than service rate.

16. The medium of claim 13, wherein the at least one control action includes at least one of adding a node to the tier and removing a node from the tier.

17. The medium of claim 13, wherein the frequency is higher than a maximum number of control actions available to the processing system per unit of time.

* * * * *